United States Patent
Dantas de Castro

(10) Patent No.: US 10,765,944 B2
(45) Date of Patent: Sep. 8, 2020

(54) MACHINE LEARNING MODELS FOR IMPLEMENTING ANIMATION ACTIONS

(71) Applicant: Electronic Arts, Inc., Redwood City, CA (US)

(72) Inventor: Cesar Dantas de Castro, Burnaby (CA)

(73) Assignee: Electronic Arts Inc., Redwood City, CA (US)

( * ) Notice: Subject to any disclaimer, the term of this patent is extended or adjusted under 35 U.S.C. 154(b) by 8 days.

(21) Appl. No.: 16/125,288

(22) Filed: Sep. 7, 2018

(65) Prior Publication Data

US 2020/0078679 A1    Mar. 12, 2020

(51) Int. Cl.
| | | |
|---|---|---|
| *A63F 9/00* | (2006.01) |
| *A63F 13/52* | (2014.01) |
| *G06T 7/70* | (2017.01) |
| *G06T 7/20* | (2017.01) |
| *G06T 13/40* | (2011.01) |
| *G06K 9/00* | (2006.01) |

(52) U.S. Cl.
CPC .......... *A63F 13/52* (2014.09); *G06K 9/00724* (2013.01); *G06T 7/20* (2013.01); *G06T 7/70* (2017.01); *G06T 13/40* (2013.01); *G06K 2009/00738* (2013.01); *G06T 2207/20081* (2013.01); *G06T 2207/20084* (2013.01); *G06T 2210/21* (2013.01)

(58) Field of Classification Search
None
See application file for complete search history.

(56) References Cited

U.S. PATENT DOCUMENTS

| | | | |
|---|---|---|---|
| 7,403,202 B1 * | 7/2008 | Nash .................. | G06T 13/40 345/474 |
| 7,967,680 B2 * | 6/2011 | Yamada .................. | A63F 13/10 463/31 |
| 9,827,496 B1 * | 11/2017 | Zinno .................... | A63F 13/577 |
| 10,388,053 B1 * | 8/2019 | Carter, Jr. .............. | G06T 13/80 |
| 2005/0013369 A1 * | 1/2005 | Lee ......................... | H04N 19/56 375/240.16 |
| 2006/0149516 A1 * | 7/2006 | Bond ..................... | A63F 13/10 703/6 |
| 2017/0238055 A1 * | 8/2017 | Chang .................... | A63F 13/60 725/19 |
| 2018/0286099 A1 * | 10/2018 | Kozloski .................. | G06T 1/60 |
| 2019/0108300 A1 * | 4/2019 | Soler Arasanz ........ | G06T 17/20 |

(Continued)

*Primary Examiner* — Seng H Lim
(74) *Attorney, Agent, or Firm* — Lee & Hayes, P.C.

(57) ABSTRACT

An animation system and method generates predictive models that are deployed in animations, such as an animation associated with a video game, to predict outcomes resulting from events occurring in the animation, such as interactions between two or more objects in the animation. These predictive models may be generated based at least in part on training data that is generated by running the animation, such as playing a video game, generating parameter values associated with events in the animation, and determining an outcome of the events. The training data may be used to generate predictive models, such as by using machine learning algorithms. The predictive models may then be deployed in the animation, such as in a video game, to make real time or near real-time predictions of outcomes based at least in part on events in the animation.

20 Claims, 10 Drawing Sheets

(56) References Cited

U.S. PATENT DOCUMENTS

| | | | |
|---|---|---|---|
| 2019/0108448 A1* | 4/2019 | O'Malia | G06N 3/0445 |
| 2019/0138889 A1* | 5/2019 | Jiang | G06N 3/0454 |
| 2019/0303404 A1* | 10/2019 | Amer | G06F 17/279 |
| 2019/0304104 A1* | 10/2019 | Amer | G06F 16/738 |
| 2019/0304156 A1* | 10/2019 | Amer | G06N 3/08 |

* cited by examiner

MACHINE LEARNING MODELS FOR IMPLEMENTING ANIMATION ACTIONS

BACKGROUND

Computer generated animation may be generated for various purposes, such as video games, online gaming, scientific purposes, object modeling, documentation, or the like. In some cases, this animation may have objects that interact as rendered to an observer of the animation, such as a video game player. In some cases, the interaction of objects within a rendered animation may result in a desired outcome to be displayed in the animation. This desired outcome, as resulting from interactions in animation, may be difficult to determine.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
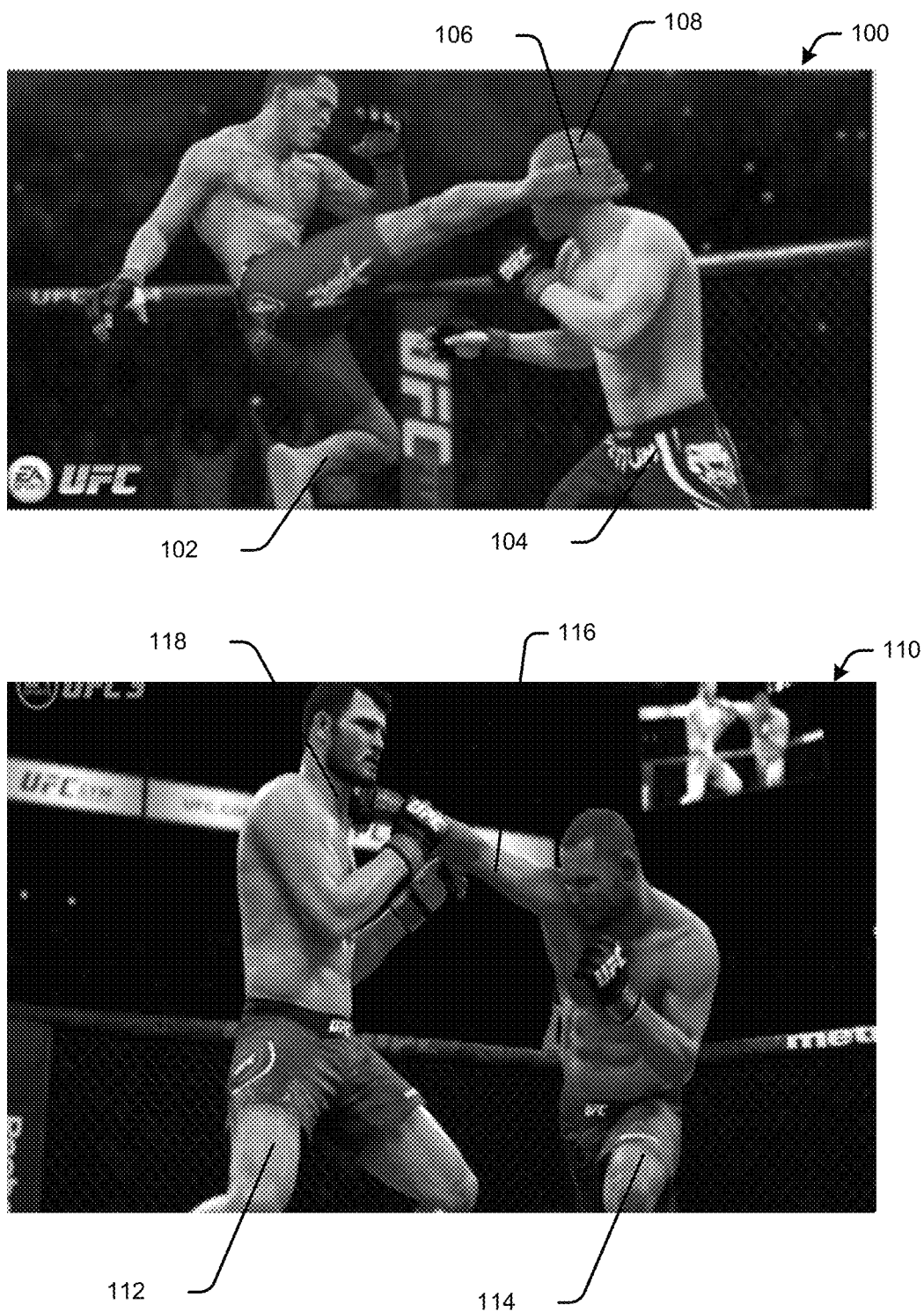
FIG. 1 illustrates a first animation still frame and second animation still frame with mixed martial arts interactions between characters from which an outcome may result, in accordance with example embodiments of the disclosure.

Example embodiments of this disclosure describe methods, apparatuses, computer-readable media, and systems for determining outcomes in an animation, such as an animation associated with a video game, that occurs due to an event in the animation. For example, the event may be an interaction of two or more objects in the animation, such as an interaction of two characters in a video game. The determination of the outcome may cause an animated action corresponding to that outcome to occur subsequent to the interaction of the objects. The outcome may be predicted using predictive models that are deployed in the animation, such as in a video game. These predictive models, in some example embodiments, may be binary outcome predictive models that predict whether a particular outcome is to occur or not. For example, in a mixed martial arts video game, a predictive model may determine whether a punch by a first character onto a second character should result in the second character falling down. Any suitable binary or non-binary outcomes may be modeled by the predictive models.

According to example embodiments of the disclosure, systems and methods may be implemented to record an animation, such as video game play, that can later be replayed and portions thereof may be ascribed an outcome. The systems and methods may also determine and/or ascribe parameter values to the animation, particularly parameter values associated with an interaction between two or more objects in the animation or to an action performed by a character in the animation. For example, in an animation in the form of an American football game, a player (e.g., a receiver) may jump to catch a pass that is thrown to that player from another player (e.g., a quarterback). The animation systems, as described herein, may determine parameter values such as the proximity of the throw to the receiver, the force of the throw, if there are any opposing players near the trajectory of the football from the quarterback and the receiver, etc. These parameters may be recorded along with the animation to allow review of the recorded animation. In some cases, the parameters and their corresponding values may represent physical parameters that may occur if the event(s) in the animation occurred in real life.

In example embodiments, the recorded animation, such as in the form of a recorded segment of video game play, may be replayed and the parameter values associated with interactions between two or more objects may be logged and/or displayed. During replay particular interactions of one or more objects in the animation may be annotated with what an outcome of the interaction of the two or more objects should be. In this way, training data may be generated from the replay of the animation. This training data may include one or more parameter values associated with an event (e.g., a movement of one or more objects) in the animation, as well as the outcome of the interaction. The training data may, in example embodiments, be a set of interactions between one or more objects in an animation, along with one or more parameters associated with individual ones of the interactions, along with what the outcome of that interaction is to be. This training data may then be used to generate predictive models, such as binary outcome predictive models, that can be incorporated into the animation, such as a video game, for live action predictions of outcomes.

As an example of the process of building predictive models, consider that a model is to be generated that is to predict whether a character in a mixed martial arts video game is to fall down. Training data may be generated by the game being played and recoded. Parameter values, such as force of a punch, location of a kick, or the like may be determined and logged for each interaction between the character and another character in the video game. During the replay, the system may accept indications of whether the character is to fall down due to individual ones of the interactions. The training data, as generated from this replay and annotation process, may then be used to build predictive models that may be deployed in the video game for real-time predictions of whether a character should fall down during game play to cause the action, as predicted.

In some cases, the initial video game play that is recorded may incorporate a preliminary predictive model. When the recorded play is replayed and annotated, an animation developer may indicate whether the preliminary predictive model made a correct determination of the outcome. In this way, the animation development system may determine the correct outcome of an event that transpires during the video game play. Referring again to the mixed martial arts video game, if a preliminary predictive model predicts that a character is to fall down, and this prediction is indicated to be in error, then the animation development system may determine that the character is not to fall down. Similarly, if the preliminary predictive model determines that a character is not to fall down, and that prediction is indicated to be correct, then again, the animation development system would determine that the character was not to fall down. In the converse, an error indicated in a prediction of not falling down, or an indication of a correct prediction in the character falling down may indicate to the animation development system that a corresponding event is to cause the character to fall down.

An event of interest in the video game play and/or replay may be determined by the animation development system based at least in part on the movements and/or locations of objects in the animation. For example, when two objects collide (e.g., a character punches another character), a determination of an event may occur. In some cases, user input may control the movement of objects in the animation. For example, a game controller input may cause a corresponding movement of an object in the video game.

The event, as determined, may have an outcome associated therewith. In example embodiments, the animation development system may solicit, from an animation developer, an indication of what the outcome for an event should be. In this way, the animation development system may be able to receive an indication of an outcome associated with an identified event in the animation. In other example embodiments, an event may be determined based at least in part on user input, such as during the replay of the recorded animation. In other words, during replay of the recorded animation, an animation developer may indicate that a particular portion of the recorded animation is an event for which an outcome is to be determined for the purposes of generating training data. During this replay of the recorded animation, the animation developer may also annotate one or more frames of the recorded animation with the outcome that is to occur from the event indicated by the animation developer.

The parameters may, in example embodiments, be user defined. For example, an animation developer may specify to the animation developer system various parameters that may be of interest in predicting an outcome of an event. These parameters may be any suitable parameter including, but not limited to, type of contact, proximity, force, location, temperature, speed, area, volume, combinations thereof, or the like. The animation developer system may determine the parameter values for events that occur in the animation recording. The parameter values may be determined based at least in part on features of the objects (e.g., size of a character's foot, the force a character can apply with its foot, etc.) and the interaction of objects in the animation. The parameter values may be multifactored, such as being based at least in part on the movements and features of more than one object. For example, a force value may be determined for a first character kicking a second character in a video game. This force factor may not just depend on the maximum force that the first character can apply and the proximity of the first character to the second character, but also on the reaction of the second character (e.g., did the second character flinch in a manner that would reduce the force of impact from the first character?). In this way, the animation development system may determine parameter values for events in the recording of the animation. Thus, the animation development system may be configured to receive and/or log training data that includes identification of an event (e.g., with a timestamp within the recorded animation), parameter values associated with the event, and an outcome of that event.

The predictive models may be any suitable models and may be generated by any suitable mechanism. These models may include machine learning models, such as logistic regression models, neural networks, clustered models, decision tree algorithms, any variety of heuristics (e.g., genetic algorithms, swarm algorithms, etc.), combinations thereof, or the like. In example embodiments, the predictive models may be a combination of different machine learning models. In further example embodiments, the models may be multivariate models. In other words, the predicted outcome may be based on more than one input variable, such as in the form of the one or more parameter values generated for interactions in a video game. In still further example embodiments, the predictive models may predict binary outcomes, where an outcome either takes place or does not take place (e.g., the character falls down or does not fall down). When deployed, such as in a video game, the predictive models may trigger an animation action, such as by calling software subroutine(s) and/or function(s). For example, in the mixed martial arts example, if a character is predicted to fall down based on the corresponding predictive model, then a fall down function may be called such that the character falls down in the animation.

In some cases, there may be a linked set of binary outcomes that may be determined for a particular interaction of objects in an animation. In these cases, a certain determination of one outcome may preclude another linked outcome from occurring. For example, consider the situation from above where a football is being passed from a quarterback to a receiver in coverage (e.g., there may be another player from an opposing team in the path of the ball from the quarterback to the receiver) in an American football-based video game. In this case, there may be an outcome determination of whether the opposing player intercepts the football. If so, then the intended receiver cannot make a fair catch. Thus, any determination of whether the football is received may be determined as no, if the football is intercepted. In this way, there may be a set of outcome determinations where one outcome may influence the determination of another potential outcome. In some of these example embodiments, the outcome of one predictive model may feed forward as a parameter to another predictive model. For example, a predictive model of the fair catch by the receiver may receive an indication of whether the football was intercepted. If the football was intercepted, then the predicted outcome of the fair catch predictive model may be no.

It should be understood that the mechanism of animation outcome determination may be applied to any variety of outcomes, such as any variety of binary outcomes. For example, outcomes may be determined in a variety of video games, such as whether a basket is made in a basketball video game, whether a foul is to be called in a basketball videogame, whether a put is to go in a hole in a golf video game, whether a collision is to occur in a racing video game, or whether a maneuver is successful in a flight simulation video game. Indeed, without providing an exhaustive list of applications, the predictive models, as generated and deployed in animation, may be applied to any suitable type of predictive outcomes in animation, such as animation for video games.

It should be understood that the systems and methods, as discussed herein, are technological improvements in the field of computer animation and video games. For example, the methods and systems as disclosed herein enables computing resources to generate more realistic animation for a variety of applications, such as video games, scientific modeling, computer graphics for movies, or the like. Indeed, the disclosure herein provides improvements in the functioning of computers to provide improvements in the technical field of computer graphics and computer animation. Additionally, the technological problems addressed here are ones that arise in the computer-era, such as in the fields of computer graphics, computer animation, video games, and/or online gaming. Thus, not only is the disclosure directed to improvements in computing technology, but also to a variety of other technical fields related to computer animation. Without the improvements, as discussed herein, an animation, such as in a video game, may have erroneous movements and outcomes during rendering. These errors in the animation may make the animation look unrealistic. With the technological improvements as discussed herein, animation may be rendered more realistically and look more physically correct.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

FIG. 1 illustrates a first animation still frame 100 and second animation still frame 110 with mixed martial arts interactions between characters 102, 104, 112, 114 from which an outcome may result, in accordance with example embodiments of the disclosure. The animation still frame 100 may include a first character 102 kicking a second character 104 in the head. An animation development system may be configured to determine one or more parameter values associated with this interaction from the kick, where the first character's foot 106 contacts the second character's head 108. The one or more parameters may include, for example, a force of the kick, an area of contact between the foot 106 and the head 108, a location of contact on the head 108 (e.g., jaw, skull, etc.), a rigidity of the second character's stance, or any other suitable data associated with the interaction in the form of the first character 102 kicking the second character 104.

This still frame 100, in example embodiments, may be captured from an animation, such as from playing a mixed martial arts video game. The animation, when being created, such as by players playing the mixed martial arts video game, may be recorded for later review. The still frame 100 may be captured during the replay of the recorded animation. This still frame 100, and/or possibly a certain number of frames before or after it, may have parameters of the interaction associated with it. Additionally, during the replay, the still frame 100 may be annotated to indicate whether the second character 104 is to fall down from the interaction in the form of the kick. For example, in this case, the interaction may be deemed to result in the second character 104 falling down. Thus, the training data points resulting from this particular interaction may include a set of parameter values (e.g., value of a force of the kick, etc.) and an outcome that the second character 104 is to fall down.

In still frame 110, there may again be a first character 112 and a second character 114. The second character 114 may be punching, with his arm 116, the first character 112 in the first character's neck 118. Again, the animation development system may generate this still frame 110 from a recording and/or replay of an animation. The animation development system may generate parameter values associated with the interaction, namely the punch, of the still frame 110. Examples of the parameters, may be the location of the punch, the force of the punch, the area of the punch, the stance of the first character 112, the stance of the second character 114, and/or any other suitable parameter values.

For example, in this case, the interaction may be deemed to result in the first character 112 not falling down. Thus, the training data points resulting from this particular interaction may include a set of parameter values (e.g., value of a force of the punch, area of the punch, etc.) and an outcome that the first character 112 is to not fall down. Thus, an outcome (e.g., the character 104 falls down) in the event of the first still frame 100 may be different from an outcome (e.g., the character 112 does not fall down) in the event of the second still frame 110.

The training data that results from the still frames 100, 110 may be collected and provided to a machine learning service that may use the training data to generate a predictive model of whether a character in this type of mixed martial arts game should fall down. This training data may include one or more parameter values, as determined from the interactions of objects/characters in the still frames 100, 110, as well as an indication of the outcome associated with the interaction. The predictive model, in this case, may be used to predict an outcome of whether a character in the mixed martial arts video game will fall down as a result of certain interactions during game play in which that character is involved. The training data may be accompanied by metadata that is descriptive of the interaction(s) in the still frames 100, 110. This metadata may include developer provided comments related to the interaction(s), as well as a time stamp within game play where the corresponding interaction occurred, and what the outcome of the interaction is to be, for the purpose of enriching the training data and/or facilitating the analysis of the training data. It should be appreciated that a richer set of training data may generally produce more robust models, that may provide relatively greater fidelity predictions with relatively lower levels of uncertainty across a wider array of situations.

The predictive models may be any suitable type of predictive model, such as any variety of machine learning models, such as a logistic regression model and/or a neural network model. The logistic regression models may be relatively lightweight models that may be relatively easy to understand and relatively computationally light to implement during deployment. The neural network models may be implemented if the prediction is a relatively difficult or non-linear problem that may not be well defined. Other machine learning model(s) that may be generated and used may include, for example, decision tree models, random forest models, Bayesian network models, or any suitable predictive model.

Once a predictive model, such as for a binary outcome (e.g., whether a character falls or not), is generated, the predictive model may be deployed, such as in a video game environment, to make predictions in real-time or near-real time (e.g., during game play). Thus, while players are playing a video game and an interaction of the players' respective characters occur, the video game may invoke the predictive model to determine an outcome corresponding to that interaction. For example, in the mixed martial arts game, if one character kicks another character during game play, the predictive model for whether the kicked character is to fall down may be used to determine in real-time whether the character should fall down. The predictive model in this way, during deployment, may trigger another function or subroutine based on the predicted outcome of an interaction. In the mixed martial arts video game case, a prediction that the character should fall down may trigger a subroutine that causes an animation where the character falls down.

Although the description of generating training data is described in the context of an event occurring in a single still frame 110, 110, it should be understood that events may occur over multiple frames of the animation. In fact, parameter values may be determined over multiple frames of the recorded game play. For example, a time of contact of the kick shown in the still frame 100 may be determined based at least in part on how many frames had contact between the first character's foot 106 and the second character's head 108. It should also be understood that different parameter values of an event may be extracted from different frames of the recorded animation. For example, a maximum area of contact of the foot 106 to the head 108 may be in a different frame than when there may be a maximum force from the foot 106 to the head 108. Therefore, the animation development system may analyze multiple still frames associated with a recorded animation to determine parameter values associated with an event in the recorded animation.

Figure 2:
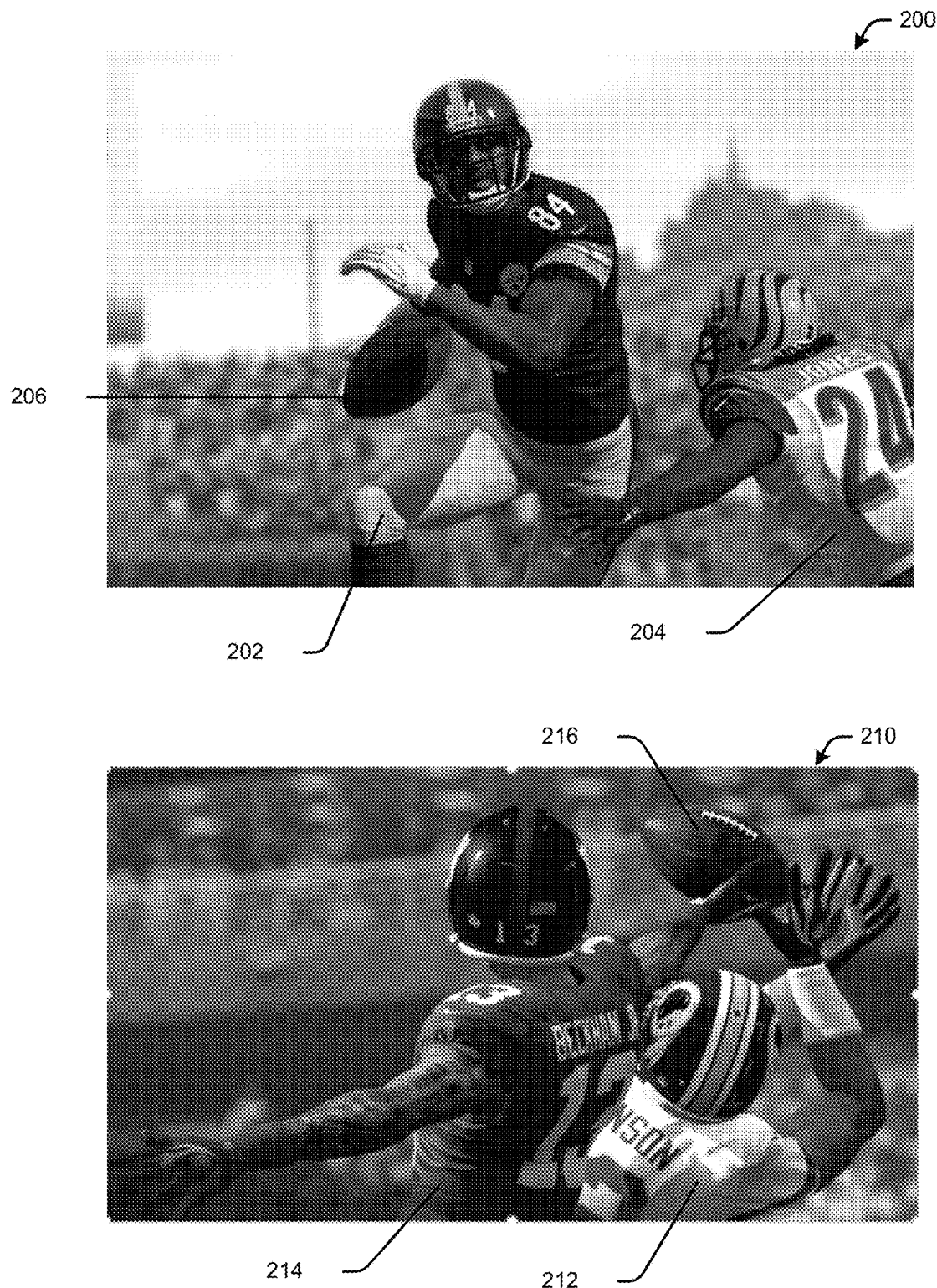
FIG. 2 illustrates a first animation still frame and second animation still frame with American football interactions between two characters from which an outcome may result, in accordance with example embodiments of the disclosure.

FIG. 2 illustrates a first animation still frame 200 and second animation still frame 210 with American football interactions between two characters from which an outcome may result, in accordance with example embodiments of the disclosure. The first still frame 200 and the second still frame 210 may occur during game play for the of an American football video game. Predictive models, as described herein may be deployed in this video game to make real-time or near real-time determinations of outcomes.

In the first still frame 200, character 202 may be an offensive player and character 204 may be a defensive player. The offensive player 202 may be carrying a football 206. The interaction as embodied in the still frame 200 may spawn one or more outcome determination, such as real-time outcome determination during game play, using one or more predictive models. For example, the event in and around still frame 200 may lead to multiple outcome determinations, such as whether the offensive player 202 will be tackled by the defensive player 204, whether the offensive player 202 will break an attempted tackle by the defensive player 204, whether the offensive player 202 fumbles the football 206, whether a facemask penalty occurs, or any other suitable outcome determinations. It should be appreciated that when there are multiple outcome determinations made from a single event, or closely related multiple events, some outcomes may be incompatible with other outcomes. For example, if there is a determination that the offensive player 202 is tackled by the defensive player 204, then it cannot be possible that the offensive player 202 breaks an attempted tackle by the defensive player 204.

In some cases, when there are multiple determinations to be made for a particular event using different predictive models, the outcome of one predictive model may be an input to another predictive model. Alternatively, each of the predictive models may make separate determinations, unencumbered by other of the predictive outcomes, for their separate outcomes.

When an outcome is determined in real-time or near real-time by the predictive model during game play (e.g., console-based game play, online game play, etc.), an animation function related to that outcome may be invoked. For example, if the football 206 is fumbled in this play depicted in still frame 200, an animation showing the football 206 bouncing and rolling around on the field may be performed.

Still frame 210 may show another interaction in an American football game, where a first player 212 (e.g., the intended receiver) may be attempting to catch a football 216 and a second player 214 (e.g., defensive player) may attempt to intercept the football 206. This event may be another situation where there may be a determination of multiple outcomes. For example, a determination may be made whether the second player 214 intercepts the football 216, whether the second player swats the football 216 away, whether the first player 212 makes a fair catch, whether there is a pass interference call, or the like. It should be understood that certain outcomes are incompatible with other outcomes. For example, if the second player 214 intercepts the football 216, then the second player 214 cannot also swat the football away. Thus, certain outcomes may be fed to predictive models to preclude disallowed combinations of outcomes from an event.

Although the discussion herein may be in the context of a video game, it should be understood that the systems and methods, as described herein, may apply to any suitable animation. For example, the mechanisms discussed herein may be applied to animation used for visualizing scientific phenomena. For example, when two atoms depicted in an animation are in proximity of each other, the animation may show the atoms bonding or not bonding with each other to form a molecule based at least in part on a predictive model of whether such a bonding outcome is to occur. The predictive model, in this case, may determine the outcome based at least in part on a variety of parameter values, such as proximity of the two atoms, the electron valency of the two atoms, the electronegativity of the two atoms, the quantum numbers of the two atoms, the ambient temperature of the surrounding of the two atoms, or the like.

Figure 3:
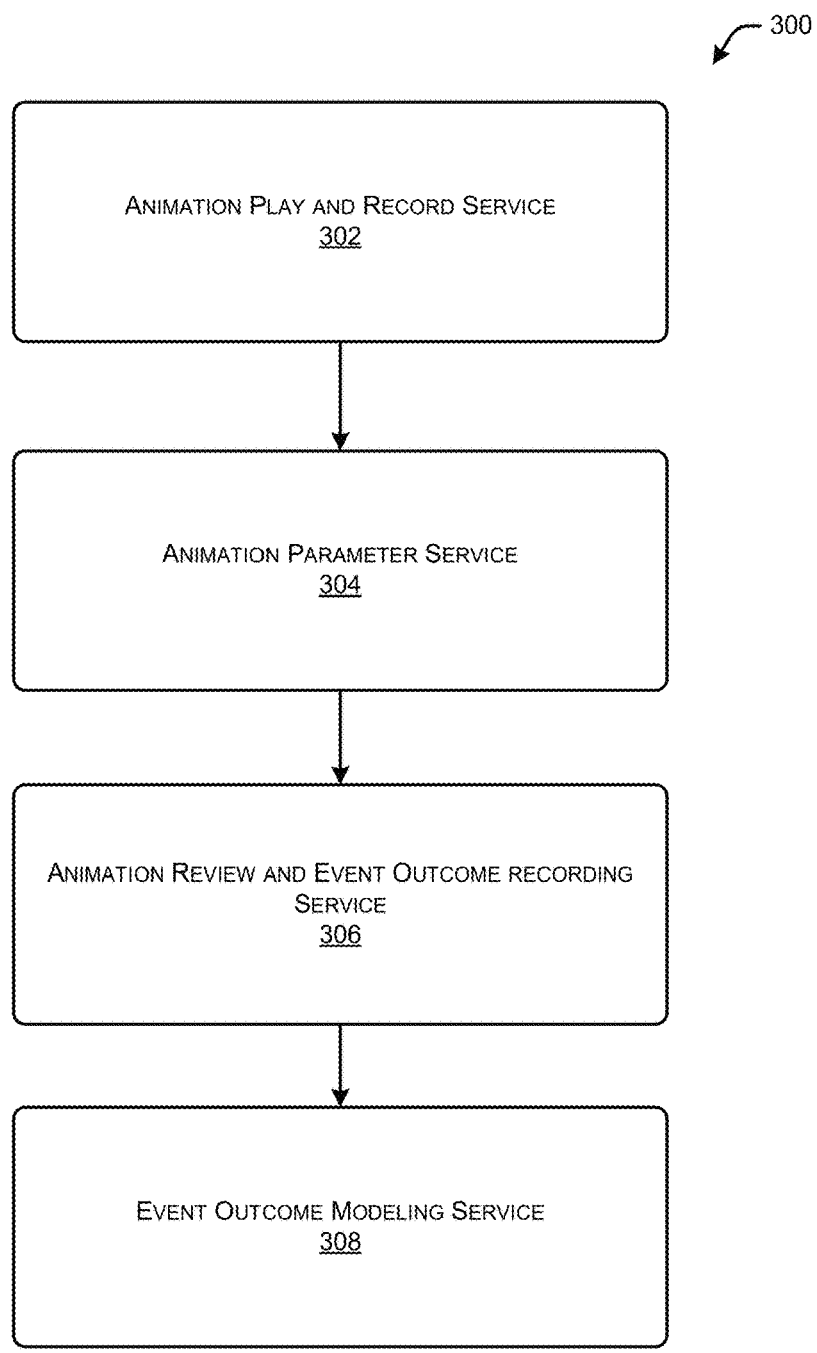
FIG. 3 illustrates a flow diagram of example services invoked to determine outcomes in animated interactions of objects, in accordance with example embodiments of the disclosure.

FIG. 3 illustrates a flow diagram of example services 302, 304, 306, 308 invoked to determine outcomes in animated interactions of objects, in accordance with example embodiments of the disclosure. These services, as part of service set 300, may be provided by one or more animation development system(s), independently or in cooperation with one or more other system(s). The disclosure herein contemplates implementation of these services 302, 304, 306, 308 in any suitable animation creation platform, animation review and replay platform, animation simulation and data collection platform, and/or machine learning platform.

An animation play and record service 302 may provide the ability to play an animation, such as a video game, and record the animation. In some cases, one or more animation developers may play a video game for the purposes of generating training data. This video game play may be recorded and then replayed to identify events of interest.

These events may be occurrences that transpire in the recorded animation, for which there may be a determination of an outcome, as disclosed herein.

An animation parameter service 304 may provide one or more parameter values associated with events that transpire on a recorded animation. In some cases, the parameters and their corresponding values may represent physical parameters that may occur if the events in the animation occurred in real life. The parameters may be determined based at least in part on features (e.g., strength of a character, size of a character, dexterity of a character, etc.) of one or more objects in the animation, the relative positions of one or more objects in the animation, interactions of objects in the animation, or any other suitable factors. The animation parameter service 304 may record the parameter values corresponding to events for an animation developer to review when he or she reviews the recorded animation.

An animation review and event outcome recording service 306 may provide the ability to replay and annotate recorded animation. An animation developer may review animation that he or she recorded and then provide an indication of what an outcome should be for events that transpire within that recording of the animation. Training data may be generated from this replay and annotation process, which in turn may then be used to build predictive models that may be deployed in a video game for real-time predictions of outcomes. In some cases, the initial video game play that is recorded may incorporate a preliminary predictive model. When the recorded play is replayed and annotated, an animation developer may indicate whether the preliminary predictive model made a correct determination or an error in predicting the outcome. In this way, the animation development system may determine the correct outcome of an event that transpires during the video game play.

An event outcome modeling service 308 may generate predictive models based at least in part on the parameter values and the outcomes organized as test data. The predictive models may also be based at least in part on new parameters and/or derived parameter values generated by mathematically combining and/or transforming the recorded parameters. In some cases, these derived parameters may improve or enhance the predictive capacity of the resulting predictive model. In some example embodiments, the event outcome modeling service 308 may be provided by the animation development system(s). In other example embodiments, other systems, such as dedicated machine learning and/or heuristics systems may provide the outcome modeling services.

The predictive models may be any suitable type of predictive model, such as any variety of machine learning models, such as a logistic regression model and/or a neural network model. The logistic regression models may be relatively lightweight models that may be relatively easy to understand and relatively computationally light to implement during deployment. The neural network models may be implemented if the prediction is a relatively difficult or non-linear problem that may not be well defined.

Other machine learning model(s) that may be generated and used may include, for example, decision tree models, random forest models, Bayesian network models, any variety of heuristics (e.g., genetic algorithms, swarm algorithms, etc.), combinations thereof, or the like. In example embodiments, the predictive models may be a combination of different machine learning models. In further example embodiments, the models may be multi-variate models. In other words, the predicted outcome may be based on more than one input variable, such as in the form of the one or more parameter values generated for interactions in a video game. In still further example embodiments, the predictive models may predict binary outcomes, where an outcome either takes place or does not take place (e.g., the character falls down or does not fall down). When deployed, such as in a video game, the predictive models may trigger an animation action, such as by calling software subroutine(s) and/or function(s). In some cases, there may be a linked set of binary outcomes that may be determined for a particular interaction of objects in an animation. In these cases, a certain determination of one outcome may preclude another linked outcome from occurring.

In example embodiments where derived parameter values may be inputs for generating the predictive models, the derived parameters may be any suitable mathematical manipulation and/or combination of independent parameter values. For example, if a particular event has parameter values of x, y, and z, corresponding to respective parameters, then some derived parameter values may include $x^2$, xy, xyz, $z^{1.8}$, log(y), $e^z$, or indeed any suitable mathematical function of x, y, and/or z. In some cases, the derived parameter values may provide for more robust consideration of interactions between parameters in the predictive models. Additionally, in some cases, the derived parameter values, as input to the predictive models, may result in more robust models that may provide relatively greater fidelity predictions with relatively lower levels of uncertainty across a wider array of situations and/or be relatively lightweight from a processing standpoint.

According to some embodiments, the service 302, 304, 306, 308 of service set 300 may be performed out of the order presented, with additional elements, and/or without some elements. Some of the operations of service 302, 304, 306, 308 may further take place substantially concurrently and, therefore, may conclude in an order different from the order of operations shown above.

Figure 4:
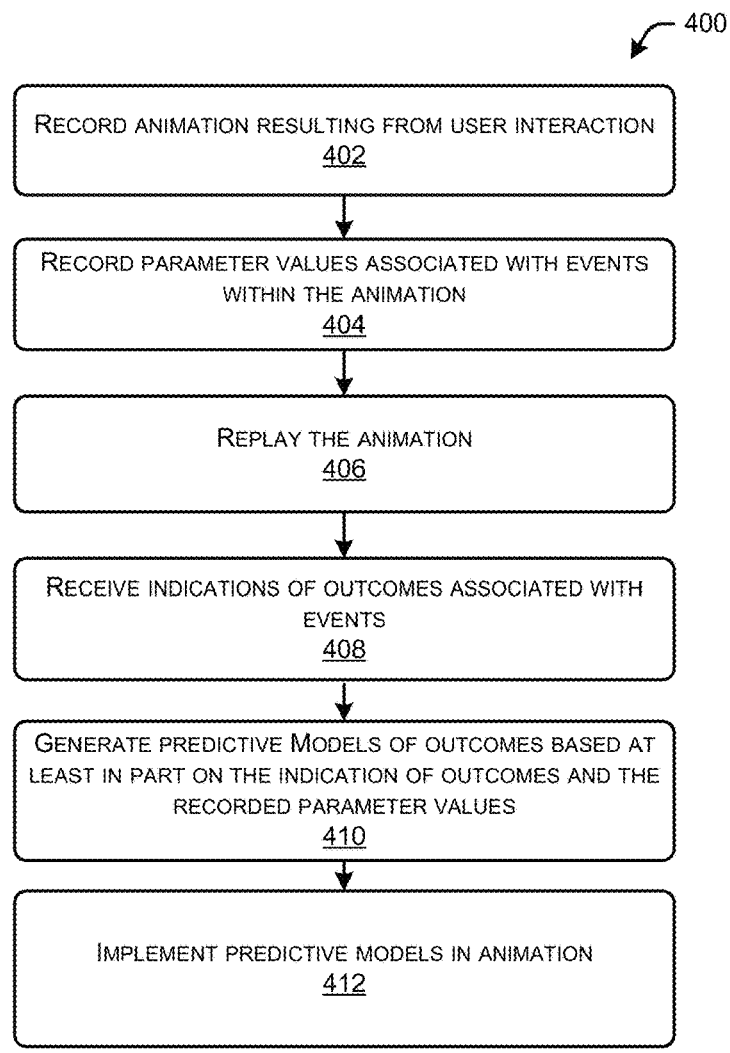
FIG. 4 illustrates a flow diagram of an example method for implementing predictive models in animation, in accordance with example embodiments of the disclosure.

FIG. 4 illustrates a flow diagram of an example method 400 for implementing predictive models in animation, in accordance with example embodiments of the disclosure. Method 400 may be performed by one or more animation development system(s) in example embodiments. In some cases, the animation development system(s) may cooperate with one or more other computing system(s) to perform the processes of method 400. The method 400, in example embodiments, may be illustrate one or more operations of services 302, 304, 306, 308 of method 400 of FIG. 4.

At block 402, animation resulting from user interaction may be recorded. In this case, the user interaction may be, for example, game play of a video game with animated characters. One or more animation developers may play a video game and the game play may be recorded for the purposes for later review and harvesting of training data therefrom.

At block 404, parameter values associated with events within the animation may be recorded. The animation development system(s) may perform a variety of analysis of objects within the recorded animation to determine the parameter values associated with events within the recorded animation. In some cases, features associated with an object in the animation may be considered in determining the parameter values. For example, the strength, the flexibility, the weight, the height, the girth, the temperature, the ductility, or indeed any other physical attributes ascribed to objects in the animation may be used to determine the parameter values associated with the events that transpire in the recorded animation. There may be predefined algorithms and/or equations to which there may be inputs of object attributes and/or positional attributes as determined from the recorded game play.

At block 406, the animation may be replayed. This replay may be prompted on the animation design system(s) by an animation designer. The replay may be to allow the animation designer to review the events in the replay and identify outcomes therein for the purposes of generating training data for building predictive models. At block 408, indications of outcomes associated with the events may be received. This may be received via user input to the animation development system, for example. In some cases, the animation, such as in the form of a video game may have a preliminary predictive model incorporated therein. In these cases, indicating the outcome of an event may entail indicating whether the preliminary predictive model made a correct prediction or not.

At block 410, predictive models of outcomes may be generated based at least in part on the indication of the outcomes and the recorded parameters. The predictive models may also be based at least in part on new and/or derived parameter values generated by mathematically combining and/or transforming the recorded parameter values, so as to improve the predictive capacity of the predictive models. As discussed herein, the predictive models may be of any suitable type, such as any variety of machine learning models. Some example machine learning models that may be used may include linear regression models and/or neural network models.

At block 412, the predictive models may be implemented in the animation. This may involve deploying the predictive model in an animation software, such as a video game. In cases, where the animation may have a preliminary predictive model for the outcome to be modeled, the preliminary predictive model may be replaced with the newly generated predictive model.

According to some embodiments, the operations of method 400 may be performed out of the order presented, with additional elements, and/or without some elements. Some of the operations of method 400 may further take place substantially concurrently and, therefore, may conclude in an order different from the order of operations shown above.

Figure 5:
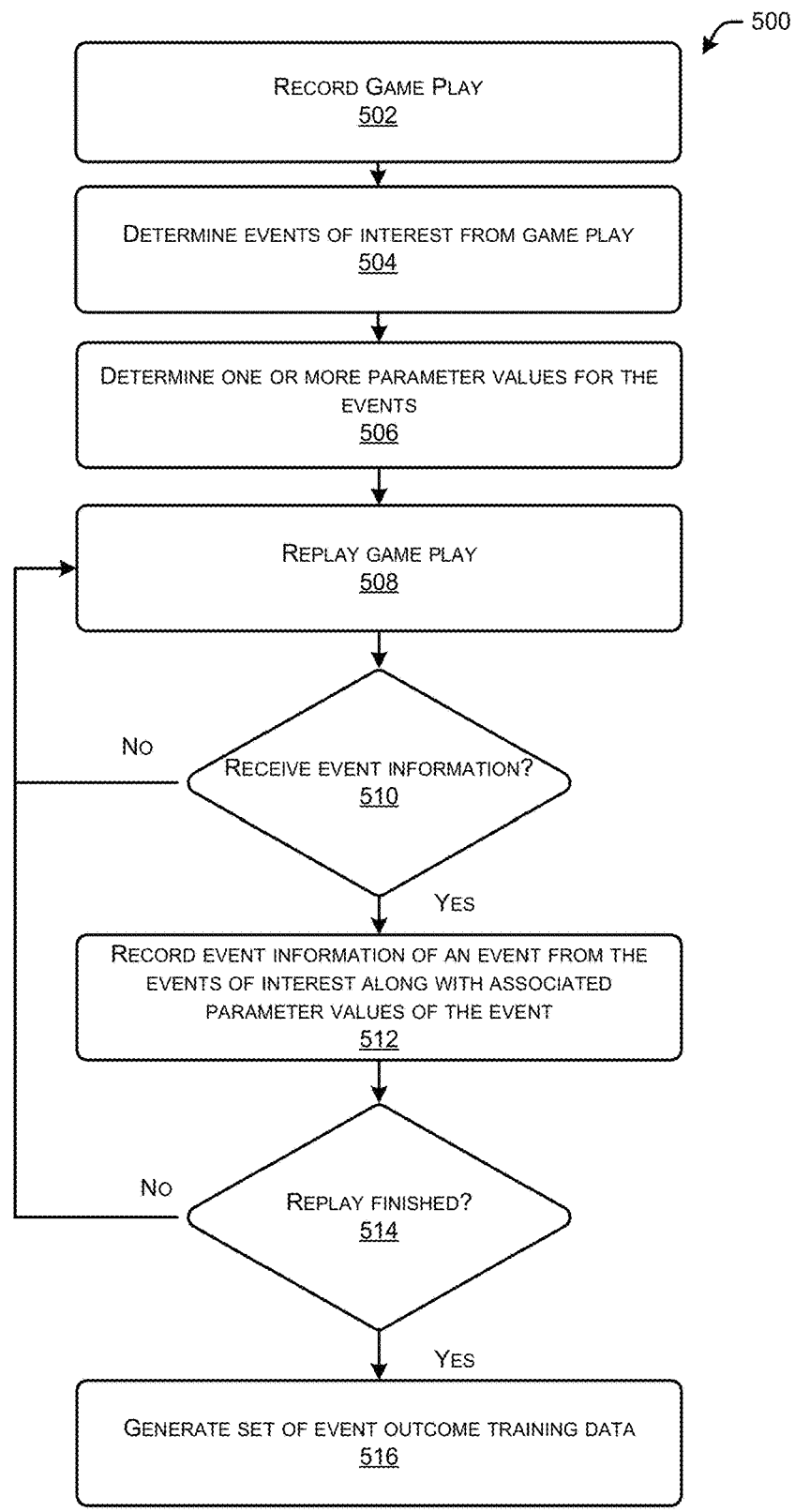
FIG. 5 illustrates a flow diagram of an example method to generate a set of event outcome training data for a video game, in accordance with example embodiments of the disclosure.

FIG. 5 illustrates a flow diagram of an example method 500 to generate a set of event outcome training data for a video game, in accordance with example embodiments of the disclosure. Method 500 may be performed by one or more animation development system(s) in example embodiments. In some cases, the animation development system(s) may cooperate with one or more other computing system(s) to perform the processes of method 500.

At block 502, game play may be recorded. One or more game developers, for example, may play a video game, while the animation development system(s) may record the played video game. At block 504, events of interest from the game play may be determined. An event of interest in the video game play and/or replay may be determined by the animation development system based at least in part on the movements and/or locations of objects in the animation. For example, a certain threshold of proximity of two objects and/or contact of two objects in the animation may prompt a determination of an event for which an outcome is to be determined. In other example embodiments, an event may be determined based at least in part on user input, such as during the replay of the recorded animation. In other words, during replay of the recorded animation, an animation developer may indicate that a particular portion of the recorded animation is an event for which an outcome is to be determined for the purposes of generating training data.

At block 506, one or more parameter values for the events may be determined. The animation development system(s) may determine the parameter values based at least in part on any variety of factors, such as user defined factors of the objects in the animation and/or animation derived factors (e.g., relative positions of the objects in the animation). The parameter values may be multifactored, such as being based at least in part on the movements and features of more than one object. In some cases, parameter values may be in relative units that may not correspond to measurement scales one may otherwise use for measuring physical phenomena. For example, a force of impact of two objects may be characterized on a scale of 1 to 10, rather than by using Newtons of force. In some cases, this process may be performed after or during the processes of block 508.

At block 508, the game play may be replayed. The replay may be performed at any desirable speed. For example, the replay may be performed in a frame-by-frame manner or at 4X speed. An animation developer may be able to stop on certain frames, such as frames in which an event of interest may occur in the recorded animation. The animation developer may be able to view the event in the frames, in forward, slow-motion, fast-motion, frame-by-frame, in reverse, or the like. The animation developer may do this to decide what the outcome with the event should be. At this point, event information, such as a correct outcome of the event may be received.

At block 510, it may be determined if event information is received. If event information is not received, the game play, or at least a portion thereof, may be replayed. If on the other hand, at block 510, event information is received, then at block 512, the event information may be recorded for an event from the events of interest along with associated parameter values of the event. These parameters may include the determined parameter values, as well as a time stamp of the recorded video.

At block 514, it may be determined whether the replay of the of the recorded game play is finished. If it is determined that the replay is not finished, then the method 500 may return to block 508 to continue replaying the game play. If, on the other hand, the replay is finished, then at block 516, a set of event outcome training data may be generated. This training data can then be used with a variety of machine learning models to generate predictive models of outcomes of events.

According to some embodiments, the operations of method 500 may be performed out of the order presented, with additional elements, and/or without some elements. Some of the operations of method 500 may further take place substantially concurrently and, therefore, may conclude in an order different from the order of operations shown above.

Figure 6:
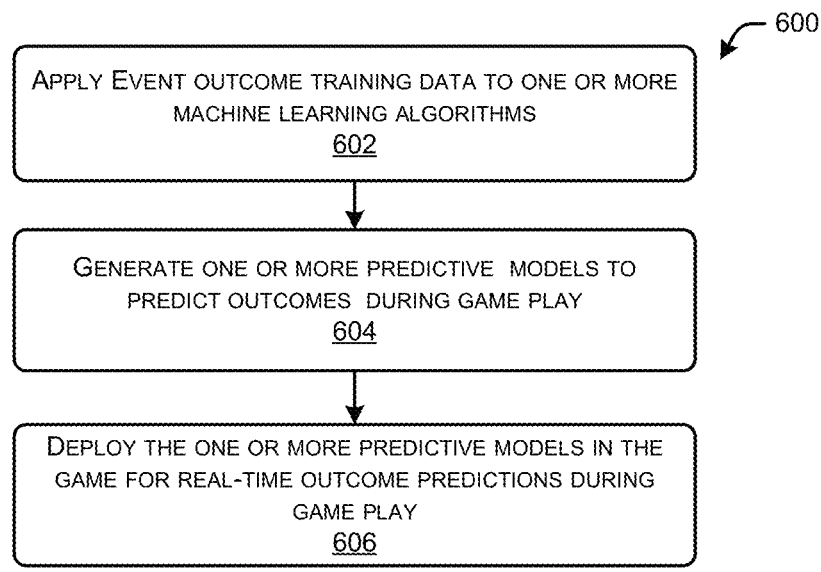
FIG. 6 illustrates a flow diagram of an example method for deploying one or more predictive models for real-time predictions of outcomes during game play, in accordance with example embodiments of the disclosure.

FIG. 6 illustrates a flow diagram of an example method 600 for deploying one or more predictive models for real-time predictions of outcomes during game play, in accordance with example embodiments of the disclosure. Method 600 may be performed by one or more animation development system(s) in example embodiments. In some cases, the animation development system(s) may cooperate with one or more other computing system(s) to perform the processes of method 600. Alternatively, method 600 may be performed by a machine learning system separate from the animation development system(s).

At block 602, event outcome training data may be applied to one or more machine learning algorithms. As discussed herein, the event outcome training data may include sets of parameter value(s) along with their outcome. This outcome training data, in example embodiments, may be collected from any number of recorded games that have been annotated with outcomes to harvest training data. It should be appreciated that a richer set of training data may generally produce more robust models, that may provide relatively greater fidelity predictions with relatively lower levels of uncertainty across a wider array of situations.

The predictive models may be any suitable type of predictive model, such as any variety of machine learning models, statistical models, artificial intelligence models, pattern recognition models, or the like. The models may be supervised learning models or unsupervised learning models. Some non-limiting examples of the predictive models may include a logistic regression model and/or a neural network model. The logistic regression models may be relatively lightweight models that may be relatively easy to understand and modify after training, and relatively computationally light to implement during deployment, such as in a video game. The neural network models may be implemented if the prediction is a relatively difficult or non-linear problem that may not be well defined. Thus, if the relationship between the parameters is complex and unknown or known to be highly non-linear, then a neural network model may be used. Other machine learning model(s) that may be generated and used may include, for example, decision tree models, random forest models, Bayesian network models, or any suitable predictive model.

At block 604, one or more predictive models may be generated to predict outcomes during game play. The predictive models may be the result of applying the outcome training data to the machine learning models. At block 606, the one or more predictive models may be deployed in the game for real-time outcome predictions during game play. This deployment may be in a video game, where an event is recognized by the video game system on which the video game is hosted as needing a determination of an outcome. The appropriate predictive model for that event may be invoked and used to determine the outcome. Based at least in part on the outcome, an animation action (e.g., a football falls and bounces, a basketball goes out of bounds, a character falls down, etc.) may be performed.

According to some embodiments, the operations of method 600 may be performed out of the order presented, with additional elements, and/or without some elements. Some of the operations of method 600 may further take place substantially concurrently and, therefore, may conclude in an order different from the order of operations shown above.

Figure 7:
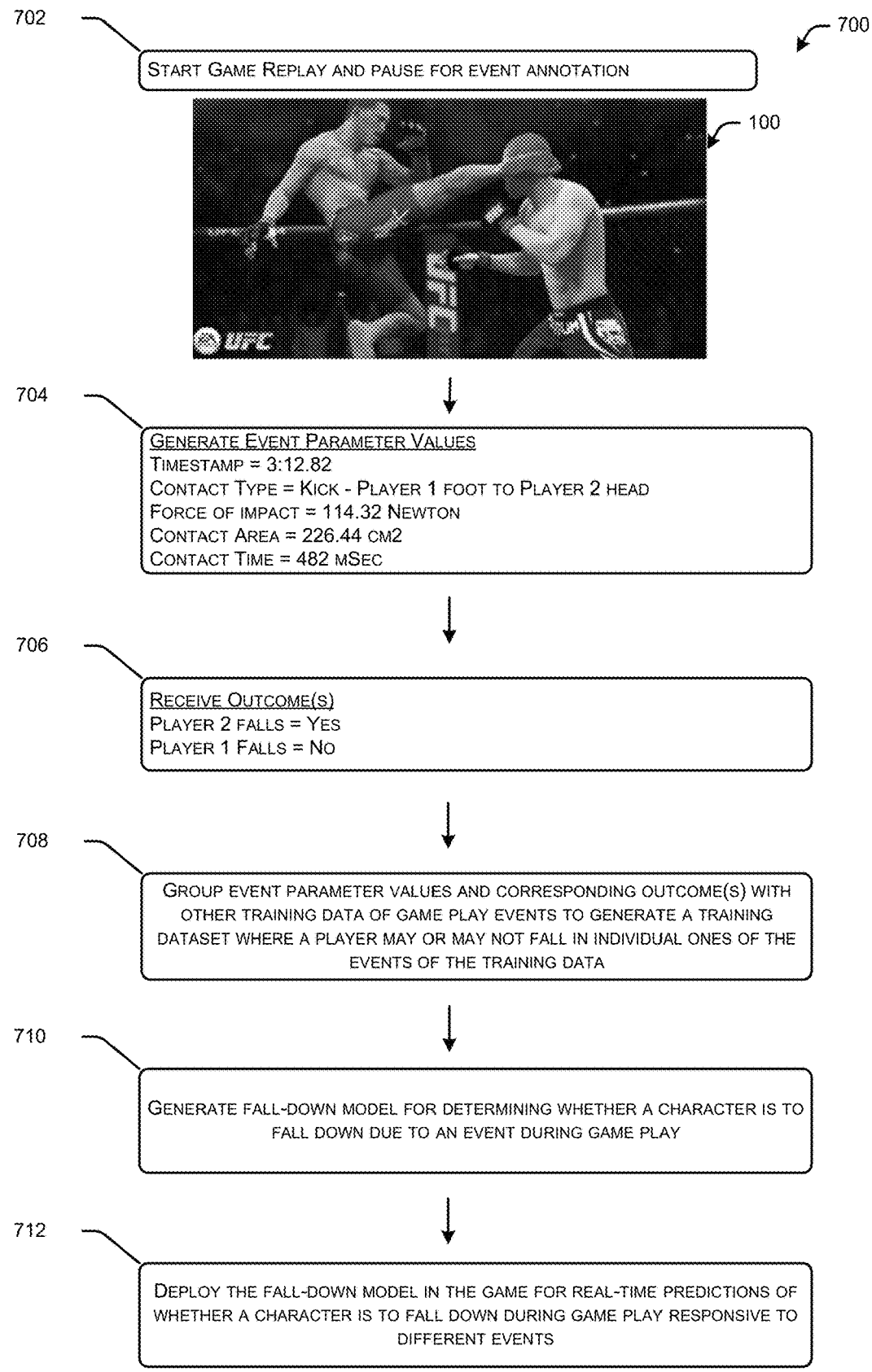
FIG. 7 illustrates a flow diagram of an example progression of operations for generating and deploying a predictive model to determine whether a character is to fall down in a mixed martial arts video game, in accordance with example embodiments of the disclosure.

FIG. 7 illustrates a flow diagram of an example progression of operations 700 for generating and deploying a predictive model to determine whether a character is to fall down in a mixed martial arts video game, in accordance with example embodiments of the disclosure. One or more of the operations 700 may be performed by one or more image manipulation system(s) in example embodiments.

At block 702, a recorded game may be replayed and paused for event annotation. In this case, still frame 100 of FIG. 100 may be used to generate outcome training data for a mixed martial arts video game. A predictive model may be desired that predicts whether a character falls or does not fall due to an event, such as an interaction with another character.

At block 704, event parameter values may be generated for the event, as captured in still frame 100. In example embodiments, the event parameters may include a time stamp, as well as physical parameters, such as a type of contact, a force of impact, contact area, contact time, or any other suitable parameter. At block 706, outcomes that are to result from the event is received. In this particular case, a game developer may annotate what the outcome should be upon viewing the animation replay. The received outcomes may indicate that player 2 falls, but player 1 does not fall.

At block 708, event parameter values and corresponding outcomes may be grouped with other training data of game play events to generate a training dataset where a player may or may not fall in individual ones of the events. At block 710, a fall-down model may be generated for determining whether a character is to fall down due to an event during game play. This fall-down model may be generated by using any variety of machine learning models and/or any other suitable models, as discussed herein. At block 712, the fall-down model may be deployed in the game for real-time predictions of whether a character is to fall down during game play responsive to different events.

Figure 8:
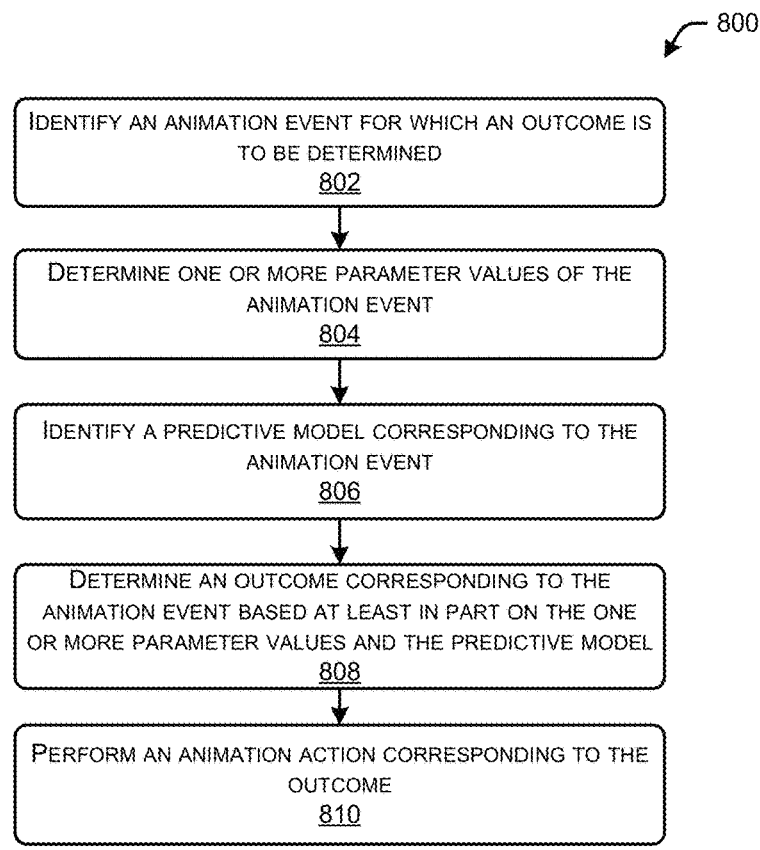
FIG. 8 illustrates a flow diagram of an example method to determine an animation outcome based at least in part on a deployed predictive model and perform an animation action corresponding to that outcome, in accordance with example embodiments of the disclosure.

FIG. 8 illustrates a flow diagram of an example method 800 to determine an animation outcome based at least in part on a deployed predictive model and perform an animation action corresponding to that outcome, in accordance with example embodiments of the disclosure.

At block 802, an animation event for which an outcome is to be determined may be identified. During the rendering of the animation, such as during game play of a video game, the event may be identified. This identification may be triggered by relative movement of one or more objects in the animation. For example, if two objects collide in the animation, a determination of an event for which an outcome is to be determined may occur.

At block 804, one or more parameter values of the animation event may be determined. The parameter values may be inputs to a predictive model that will be used to predict the outcome from the event identified by the processes of block 802. Similar to the processes of generating parameter values for training data, the parameter values during real-time game play may be determined based at least in part on any variety of interaction of objects within the animation and/or features of the objects.

At block 806, a predictive model corresponding to the animation event may be identified. This predictive model may be invoked based at least in part on the type of event that transpired. It should be noted that predictive model that corresponds to the identified event may be one of many predictive models that may be incorporated in the video game.

At block 808, an outcome corresponding to the animation event may be determined based at least in part on the one or more parameter values and the predictive model. This may be a binary (e.g., yes or no) determination of a particular outcome. The outcome determination may be an output of the predictive model. The outcome may result from providing the predictive model with determined parameter values and/or other derived parameter values generated by mathematical manipulations of the determined parameter value(s).

At block 810, an animation action corresponding to the outcome may be performed. This may entail calling a subroutine or function in the video game. For example, the animation may involve a movement in one or more of the objects that were part of the event in the animation.

According to some embodiments, the operations of method 800 may be performed out of the order presented, with additional elements, and/or without some elements. Some of the operations of method 800 may further take place substantially concurrently and, therefore, may conclude in an order different from the order of operations shown above.

Figure 9:
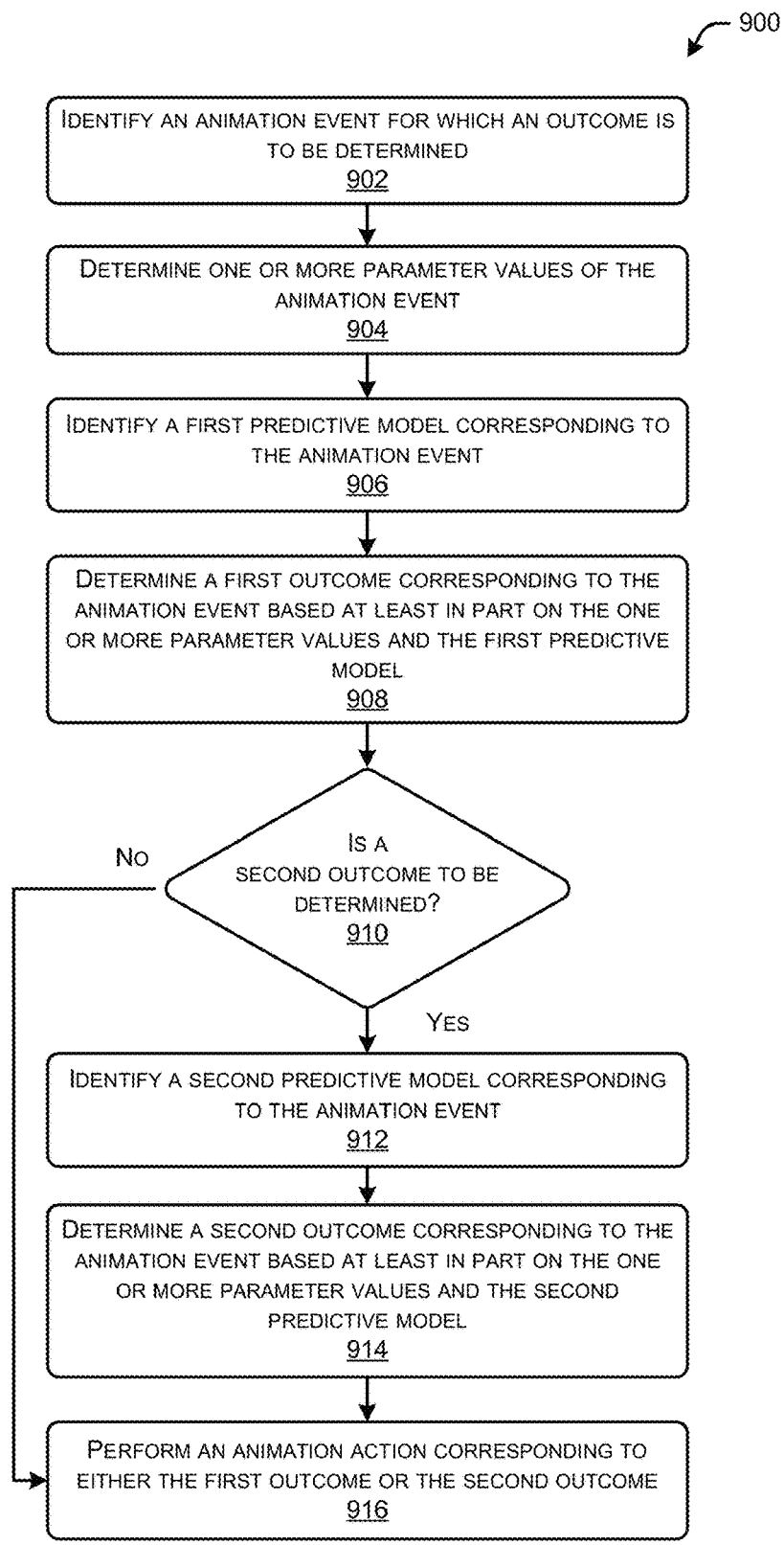
FIG. 9 illustrates a flow diagram of an example method to perform an animation action corresponding to linked outcomes, in accordance with example embodiments of the disclosure.

FIG. 9 illustrates a flow diagram of an example method 900 to perform an animation action corresponding to linked outcomes, in accordance with example embodiments of the disclosure. The outcomes, as discussed in this example method 900, may be linked outcomes, or outcomes where one outcome may influence the determination of another outcome. In this way, the prediction of one predictive model may influence the prediction of another predictive model.

At block 902, an animation event for which an outcome is to be determined may be identified. During the rendering of the animation, such as during game play of a video game, the event may be identified. This identification may be triggered by relative movement of one or more objects in the animation. For example, if two objects collide in the animation, a determination of an event for which an outcome is to be determined may occur.

At block 904, one or more parameter values of the animation event may be determined. The parameter values may be inputs to a predictive model that will be used to predict the outcome from the event identified by the processes of block 902. Similar to the processes of generating parameter values for training data, the parameter values during real-time game play may be determined based at least in part on any variety of interaction of objects within the animation and/or features of the objects.

At block 906, a first predictive model corresponding to the animation event may be identified. This first predictive model may be invoked based at least in part on the type of event that transpired. It should be noted that predictive model that corresponds to the identified event may be one of many predictive models that may be incorporated in the video game.

At block 908, a first outcome corresponding to the animation event may be determined based at least in part on the one or more parameters and the first predictive model. This outcome determination may be an output of the first predictive model.

At block 910, it may be determined whether a second outcome is to be determined. If there is no other outcomes to be determined for the animation event, then the method 900 may proceed to block 916 where an animation action corresponding to the first outcome may be performed. On the other hand, if it is determined at block 910 that there is a second outcome to be determined for the animation event, then the method may proceed to block 912 where a second predictive model may be identified corresponding to the animation event.

At block 914, a second outcome corresponding to the animation event may be determined based at least in part on the one or more parameter values and the second predictive model. In some cases, the outcome of the first predictive model may be an input to the second predictive model, such as in cases where the two outcomes may be linked. At block 916, animation actions corresponding to both the first outcome and the second outcome may be performed.

Figure 10:
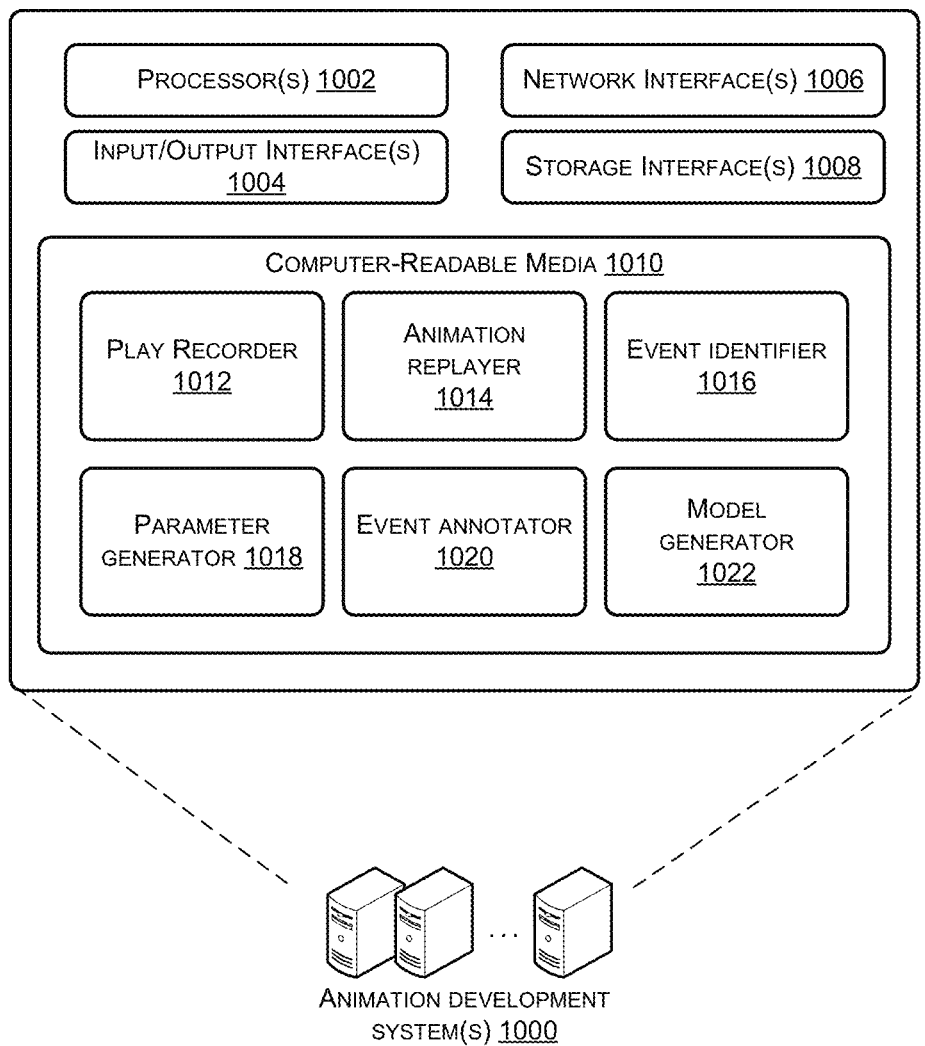
FIG. 10 illustrates a block diagram of example animation development system(s) that may provide predictive model generation services, in accordance with example embodiments of the disclosure.

FIG. 10 illustrates a block diagram of example animation development system(s) 1000 that may provide predictive model generation services, in accordance with example embodiments of the disclosure. The animation development system(s) 1000 may include one or more processor(s) 1002, one or more input/output (I/O) interface(s) 1004, one or more network interface(s) 1006, one or more storage interface(s) 1008, and computer-readable media 1010.

In some implementations, the processors(s) 1002 may include a central processing unit (CPU), a graphics processing unit (GPU), both CPU and GPU, a microprocessor, a digital signal processor or other processing units or components known in the art. Alternatively, or in addition, the functionality described herein may be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 1002 may possess its own local memory, which also may store programs, program data, and/or one or more operating systems. The one or more processor(s) 1002 may include one or more cores.

The one or more input/output (I/O) interface(s) 1004 may enable the animation development system(s) 1000 to detect interaction with a user (e.g., an animation developer) and/or other computing system(s). The I/O interface(s) 1004 may include a combination of hardware, software, and/or firmware and may include software drivers for enabling the operation of any variety of I/O device(s) integrated on the animation development system(s) 1000 or with which the animation development system(s) 1000 interacts, such as displays, microphones, speakers, cameras, switches, and any other variety of sensors, or the like. In example embodiments, the I/O devices of the animation development system(s) 1000 may include audio, video, and/or other input functionality.

The network interface(s) 1006 may enable the animation development system(s) 1000 to communicate via the one or more network(s). The network interface(s) 1006 may include a combination of hardware, software, and/or firmware and may include software drivers for enabling any variety of protocol-based communications, and any variety of wireline and/or wireless ports/antennas. For example, the network interface(s) 1006 may comprise one or more of a cellular radio, a wireless (e.g., IEEE 802.1x-based) interface, a Bluetooth® interface, and the like. In some embodiments, the network interface(s) 1006 may interfaces to the Internet. The network interface(s) 1006 may further enable the animation development system(s) 1000 to communicate over circuit-switch domains and/or packet-switch domains.

The storage interface(s) 1008 may enable the processor(s) 1002 to interface and exchange data with the computer-readable medium 1010, as well as any storage device(s) external to the animation development system(s) 1000. The storage interface(s) 1008 may further enable access to removable media.

The computer-readable media 1010 may include volatile and/or nonvolatile memory, removable and non-removable media implemented in any method or technology for storage of information, such as computer-readable instructions, data structures, program functions, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 1010 may be implemented as computer-readable storage media (CRSM), which may be any available physical media accessible by the processor(s) 1002 to execute instructions stored on the memory 1010. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information, and which can be accessed by the processor(s) 1002. The computer-readable media 1010 may have an operating system (OS) and/or a variety of suitable applications stored thereon. The OS, when executed by the processor(s) 1002 may enable management of hardware and/or software resources of the animation development system(s) 1000.

Several functional blocks having instruction, data stores, and so forth may be stored within the computer-readable media 1010 and configured to execute on the processor(s) 1002. The computer readable media 1010 may have stored thereon a play recorder 1012, an animation replayer 1014, an event identifier 1016, a parameter generator 1018, an event annotator 1020, and a model generator 1022. It will be appreciated that each of the blocks 1012, 1014, 1016, 1018, 1020, 1022, may have instructions stored thereon that when executed by the processor(s) 1002 may enable various functions pertaining to the operations of the animation development system(s) 1000. It should further be noted that one or more of the functions 1012, 1014, 1016, 1018, 1020, 1022 may work in conjunction with one or more other imaging software, such as Maya® by Autodesk, Inc. of San Rafael, Calif.

The instructions stored in the play recorder 1012, when executed by the processor(s) 1002, may configure the animation development system(s) 1000 to record game play, such as for later replay. The animation development system(s) 1000 may be configured to record one or more animation developers play a video game for the purposes of generating training data. This video game play may be recorded and then replayed to identify events of interest. The recording may be stored in memory, storage, or any suitable location.

The instructions stored in the animation replayer 1014, when executed by the processor(s) 1002, may configure the animation development system(s) 1000 to replay and annotate recorded animation. An animation developer may be able to interact with the animation developer system(s) 1000 to review animation that he or she recorded and then provide an indication of what an outcome should be for events that transpire within that recording of the animation. Training data may be generated from this replay and annotation process, which in turn may then be used to build predictive models that may be deployed a video game for real-time predictions of outcomes.

The instructions stored in the event identifier 1016, when executed by the processor(s) 1002, may configure the animation development system(s) 1000 to identify an event of interest in the video game play and/or replay. This identification may be based at least in part on the movements and/or locations of objects in the animation. For example, when two objects collide (e.g., a character punches another character), a determination of an event may occur. In other example embodiments, an event may be determined based at least in part on user input, such as during the replay of the recorded animation. In other words, during replay of the recorded animation, an animation developer may indicate that a particular portion of the recorded animation is an event for which an outcome is to be determined for the purposes of generating training data. During this replay of the recorded animation, the animation development system(s) 1000 may receive annotation of one or more frames of the recorded animation with the outcome that is to occur from the event indicated by the animation developer.

The instructions stored in the parameter generator 1018, when executed by the processor(s) 1002, may configure the animation development system(s) 1000 to generate parameter values associated with identified events. The parameters may, in example embodiments, be user defined. For example, an animation developer may specify to the animation developer system various parameters that may be of interest in predicting an outcome of an event. These parameters may be any suitable parameter including, but not limited to, type of contact, proximity, force, location, temperature, speed, area, volume, combinations thereof, or the like. The animation developer system(s) 1000 may be configured to determine the parameter values for events that occur in the animation recording.

The parameter values may be determined based at least in part on features of the objects (e.g., size of a character's foot, the force a character can apply with its foot, etc.) and the interaction of objects in the animation. The parameter values may be multifactored, such as being based at least in part on the movements and features of more than one object. For example, a force value may be determined for a first character kicking a second character in a video game. This force factor may not just depend on the maximum force that the first character can apply and the proximity of the first character to the second character, but also on the reaction of the second character (e.g., did the second character flinch in a manner that would reduce the force of impact from the first character?). In this way, the animation development system may determine parameter values for events in the recording of the animation. Thus, the animation development system may be configured to receive and/or log training data that includes identification of an event (e.g., with a timestamp within the recorded animation), parameter values associated with the event, and an outcome of that event.

The instructions stored in the event annotator 1020, when executed by the processor(s) 1002, may configure the animation development system(s) 1000 to receive information about the outcomes of events and generate training data therefrom. During replay, particular interactions of one or more objects in the animation may be annotated with what an outcome of the interaction of the two or more objects should be. In this way, training data may be generated from the replay of the animation. This training data may include one or more parameter values associated with an event (e.g., a movement of one or more objects) in the animation, as well as the outcome of the interaction. The training data may, in example embodiments, be a set of interactions between one or more objects in an animation, along with one or more parameters associated with individual ones of the interactions, along with what the outcome of that interaction is to be.

In some cases, the initial video game play that is recorded may incorporate a preliminary predictive model. When the recorded play is replayed and annotated, an animation developer may indicate whether the preliminary predictive model made a correct determination or an error in predicting the outcome. In this way, the animation development system may determine the correct outcome of an event that transpires during the video game play. The event, as determined, may have an outcome associated therewith. In example embodiments, the animation development system(s) 1000 may solicit, from an animation developer, an indication of what the outcome for an event should be. In this way, the animation development system may be able to receive an indication of an outcome associated with an identified event in the animation.

The instructions stored in the model generator 1022, when executed by the processor(s) 1002, may configure the animation development system(s) 1000 to generate predictive models. In some example embodiments, the predictive models may be generated by the animation development system(s) 1000. In other example embodiments, other systems, such as dedicated machine learning and/or heuristics systems may provide the outcome modeling services. The predictive models may be any suitable type of predictive model, such as any variety of machine learning models, such as a logistic regression model and/or a neural network model. The logistic regression models may be relatively lightweight models that may be relatively easy to understand and relatively computationally light to implement during deployment. The neural network models may be implemented if the prediction is a relatively difficult or non-linear problem that may not be well defined.

Other machine learning model(s) that may be generated and used may include, for example, decision tree models, random forest models, Bayesian network models, any variety of heuristics (e.g., genetic algorithms, swarm algorithms, etc.), combinations thereof, or the like. In example embodiments, the predictive models may be a combination of different machine learning models. In further example embodiments, the models may be multi-variate models. In other words, the predicted outcome may be based on more than one input variable, such as in the form of the one or more parameter values generated for interactions in a video game. In still further example embodiments, the predictive models may predict binary outcomes, where an outcome either takes place or does not take place (e.g., the character falls down or does not fall down). When deployed, such as in a video game, the predictive models may trigger an animation action, such as by calling software subroutine(s) and/or function(s). In some cases, there may be a linked set of binary outcomes that may be determined for a particular interaction of objects in an animation. In these cases, a certain determination of one outcome may preclude another linked outcome from occurring.

The illustrated aspects of the claimed subject matter may also be practiced in distributed computing environments where certain tasks are performed by remote processing devices that are linked through a communications network. In a distributed computing environment, program functions can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus implement one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An animation development system, comprising:
    one or more processors; and
    one or more computer-readable media storing computer-executable instructions that, when executed by the one or more processors, cause the one or more processors to:
    identify a first event that transpires during a video game play of a video game;
    determine one or more parameter values associated with the first event;
    identify a first outcome associated with the first event;
    generate training data based at least in part on the one or more para meter values and the first outcome; and generate a predictive model based at least in part on the training data; and deploy the predictive model in the video game to make a prediction of a second outcome associated with a second event that transpires during game play of the video game.

2. The animation development system of claim 1, wherein the computer-executable instructions further cause the one or more processors to:

invoke a function based at least in part on the second outcome.

3. The animation development system of claim 1, wherein the prediction of the second outcome comprises a determination that an animated character is to fall down, wherein the computer-executable instructions further cause the one or more processors to:

cause the animated character in the video game to fall down during the game play of the video game.

4. The animation development system of claim 1, wherein to generate the predictive model based at least in part on the training data, the computer-executable instructions further cause the one or more processors to:

determine the predictive model by applying the training data to at least one machine learning algorithm.

5. The animation development system of claim 1, wherein the predictive model comprises at least one of: (i) a logistic regression algorithm; (ii) a neural network model; (iii) a decision tree model; (iv) a random forest model; or (v) a Bayesian network model.

6. The animation development system of claim 1, wherein to generate training data based at least in part on the one or more parameter values and the first outcome, the computer-executable instructions further cause the one or more processors to:

aggregate the one or more parameter values and the first outcome with one or more other sets of parameters and outcomes.

7. The animation development system of claim 1, wherein to determine one or more parameter values, the computer-executable instructions further cause the one or more processors to:

identify a first object in the video game play;
identify a second object in the video game play;
determine a location of the first object relative to the second object;
determine that the first object and the second object are in contact; and
determine the one or more parameter values based at least in part on determining that the first object and the second object are in contact.

8. The animation development system of claim 1, the computer-executable instructions further cause the one or more processors to:

identify a second event that transpires during the video game play;
determine one or more second parameter values associated with the second event; and
identify a second outcome associated with the second event, wherein the training data is further based at least in part on the one or more second parameter values and the second outcome.

9. An animation development method, comprising:
identifying, by one or more processors and based at least in part on analyzing movement of an object in an animation in a video game, an event that transpires in the animation;

determining, by the one or more processors, a parameter value associated with the event;
identifying, by the one or more processors, an outcome associated with the event;
generating, by the one or more processors, training data associated with the video game and based at least in part on the parameter value and the outcome;
generating, by the one or more processors, a predictive model based at least in part on the training data; and
deploying the predictive model in the video game to predict one or more second outcomes corresponding to one or more second events that transpire during video game play of the video game.

10. The animation development method of claim 9, further comprising:
recording the animation;
replaying the animation; and
annotating the animation during the replay of the animation to generate the training data.

11. The animation development method of claim 9, wherein identifying an outcome associated with the event further comprises receiving user input indicating the outcome.

12. The animation development method of claim 9, wherein the predictive model comprises at least one of: (i) a logistic regression algorithm; (ii) a neural network model; (iii) a decision tree model; (iv) a random forest model; or (v) a Bayesian network model.

13. The animation development method of claim 9, wherein generating training data further comprises aggregating the parameter value and the outcome with one or more other sets of parameters and outcomes.

14. The animation development method of claim 9, further comprising:
determining a second parameter value associated with the event;
identifying a second outcome associated with the event;
generating second training data based at least in part on the second parameter value and the second outcome; and
generating a second predictive model based at least in part on the second training data.

15. A system, comprising:
one or more processors; and
one or more computer-readable media storing computer-executable instructions that, when executed by the one or more processors, cause the one or more processors to:
receive a first input during a video game play of a video game, the first input corresponding to a first object rendered in the video game;
receive a second input during the video game play of the video game, the second input corresponding to a second object rendered in the video game;
determine an occurrence of an event in the video game based at least in part on the first input and the second input;
identify a predictive model associated with the event, the predictive model comprising a machine learning model trained on previous video game play training data associated with the video game;
determine, based at least in part on the predictive model, an outcome in the video game associated with the event; and
render, based at least in part on the outcome, an animation action on at least one of the first object or the second object.

16. The system of claim 15, wherein the first object is a first character in the video game, the second object is a second character in the video game, and the animation action comprises the first character falling down.

17. The system of claim 15, wherein the first object is a first character in the video game, the second object is a ball in the video game, and the animation action comprises the first character catching the ball.

18. The system of claim 15, wherein the machine learning model comprises at least one of: (i) a logistic regression algorithm; (ii) a neural network model; (iii) a decision tree model; (iv) a random forest model; or (v) a Bayesian network model.

19. The system of claim 15, wherein the first input is a game controller input that causes a corresponding movement of the first object in the video game.

20. The system of claim 15, wherein the previous game play training data includes an indication of a plurality of events that transpired during a previous session of video game play.

* * * * *